United States Patent [19]

Meinecke et al.

[11] 4,387,003
[45] Jun. 7, 1983

[54] HEADBOX FOR PAPERMAKING MACHINE

[75] Inventors: Albrecht Meinecke; Elemer Csordas; Dieter Egelhof, all of Heidenheim, Fed. Rep. of Germany

[73] Assignee: J. M. Voith GmbH, Heidenheim, Fed. Rep. of Germany

[21] Appl. No.: 284,525

[22] Filed: Jul. 17, 1981

[30] Foreign Application Priority Data

Jul. 25, 1980 [DE] Fed. Rep. of Germany ....... 3028186

[51] Int. Cl.³ .............................................. D21F 1/06
[52] U.S. Cl. .................................... 162/336; 162/343
[58] Field of Search .............. 162/289, 336, 338, 343, 162/380

[56] References Cited

U.S. PATENT DOCUMENTS

| 3,328,236 | 6/1967 | Burgess, Jr. et al. | 162/342 |
| 3,769,155 | 10/1973 | Schiel | 162/336 |
| 3,945,882 | 3/1976 | Egelhof et al. | 162/340 |
| 4,198,270 | 4/1980 | Kurtz et al. | 162/343 |

FOREIGN PATENT DOCUMENTS 692907  8/1964  Canada .............................. 162/343

Primary Examiner—Peter Chin
Attorney, Agent, or Firm—Lon H. Romanski

[57] ABSTRACT

A manifold-like chamber is shown having a plurality of distribution conduits in communication therewith for evenly and uniformly distributing fluid pulp stock for subsequent paper forming operations; alternate ones of such conduits communicate with the chamber as at a relatively low elevation thereof while intermediate alternate ones of such conduits communicate with the chamber at a relatively higher elevation; the distribution conduits are formed as with two straight sections joined by an intermediate single curved or bent portion to further enhance turbulence therein; the distribution conduits are further situated as have the discharge therefrom generally parallel, at least as viewed from above; edge-forming means is provided within the chamber as to thereby obtain desired flow patterns within the fluid pulp in the chamber.

8 Claims, 4 Drawing Figures

U.S. Patent  Jun. 7, 1983  4,387,003
Fig. 1
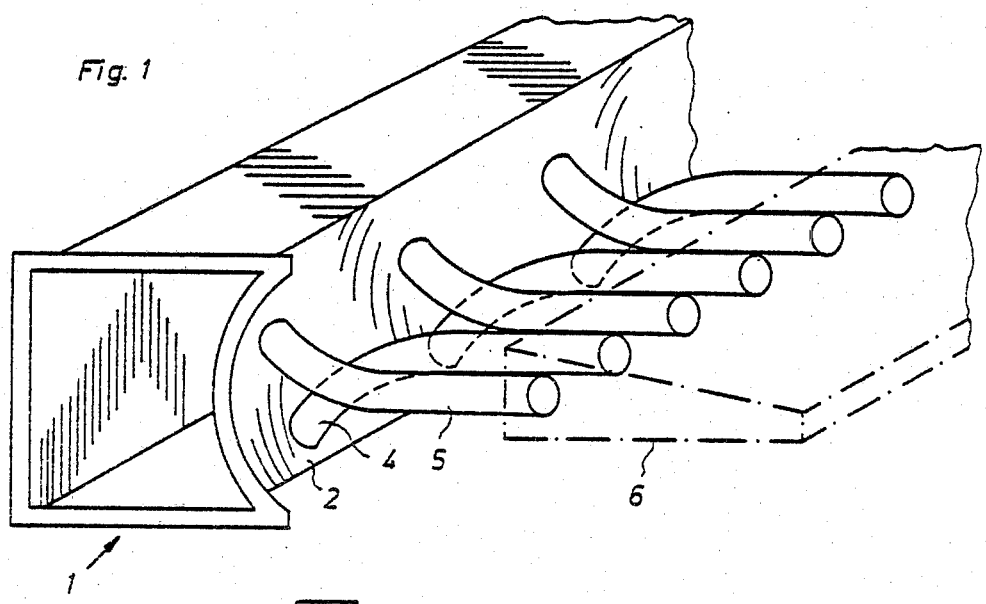
Fig. 2
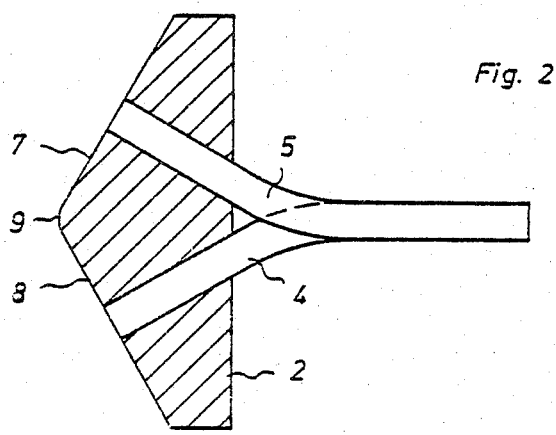
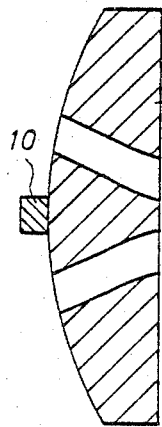
Fig. 3a
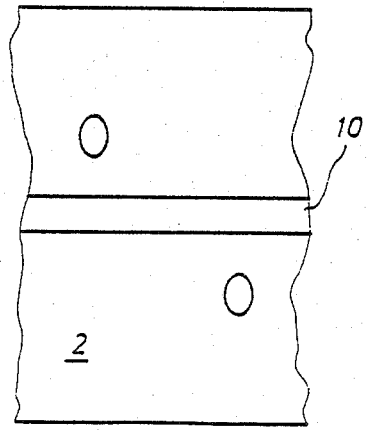
Fig. 3b

HEADBOX FOR PAPERMAKING MACHINE

FIELD OF THE INVENTION

This invention relates generally to papermaking machines and more particularly to structure associated therewith for feeding the fluid pulp stock as onto associated carrying means, for example, moving belt or screen means, employed for forming the paper web from such stock.

BACKGROUND OF THE INVENTION AND PRIOR ART STATEMENT

Heretofore, the prior art has attempted to employ headbox structures with a plurality of distribution type pipes or conduits in the belief that a better quality of paper could thereby be achieved. That is, for example, the characteristic or quality of transparency of the paper can be enhanced if a uniform paper fiber distribution is achieved.

Prior art attempts at employing such headbox structures comprised of a plurality of distribution conduits or tubes have not been totally successful especially in situations where the pulp stock is comprised of long fibers. In those situations, the long fibers get caught or trapped as at the inlet or inlets of the distribution tubes and, in turn, cause an undesirable blockage, partial or total, to flow through the related distribution conduits which, of course, results in an uneven distribution of the pulp stock being fed. The prior art has attempted to overcome this problem by providing greater space between adjacent inlets to the distribution tubes or conduits; however, such has not successfully overcome the problem.

Federal Republic of Germany Letters Patent No. 2,007,308 which attempts to achieve uniformity of distribution and employs a plurality of discharge tubes or channels, has such discharge tubes or channels of straight configuration and situated as to have the respective flows exiting as from two adjacent discharge tubes passing in directions generally convergent thereby impinging upon each other in the hope that such impingement will result in somewhat a rebounding action of the pulp stock and that the fibers will be deposited in an even and uniform manner. However, such attempts have not proven to be successful.

In Federal Republic of Germany Publication No. AS-14-61-072 the use of a plurality of discharge tubes or conduits is also disclosed; however, in comparison to said Fed. Rep. of Germany Pat. No. 2,007,308, such discharge tubes, as in the general area of their respective discharge orifices, are parallel to each other thereby preventing the impingement of pulp stock flows sought in said German Pat. No. 2,007,308. Further, the discharge conduits of said Publication No. AS-14-61-072 are formed as to have generally oppositely directed dual bends which, of course, complicates fabrication and increases the costs thereof. This structure also has not proven to be totally successful in overcoming the problems of the prior art.

The headbox structure of Fed. Rep. of Germany Letters Patent No. 2,307,849 even though not providing completely satisfactory results nevertheless provides results superior to that obtainable as with the teachings of either said Fed. Rep. of Germany Letters Patent No. 2,007,308 or Publication No. AS-14-61-072. However, in those situations where the pulp stock has, for example, exceptionally long fibers, as may be used in the fabrication of cardboard, the structure of said German Pat. No. 2,307,849 becomes unsuitable because of the fact that such long fibers still tend to get stuck, accumulate and generally not be uniformly distributed.

The invention as herein disclosed and claimed is primarily directed to the solution of the aforestated and other related and attendant problems.

SUMMARY OF THE INVENTION

According to one aspect of the invention, a headbox for a papermaking machine comprises manifold-like chamber means for receiving therein a fluid supply of pulp stock, and a plurality of distribution conduits communicating between said manifold-like chamber means and a related pulp stock receiving area, said plurality of distribution conduits being effective to flow said pulp stock from said manifold-like chamber means to said receiving area, each of said plurality of conduits having an inlet end and an outlet end, the inlet ends of adjacent ones of said conduits being spaced from each other as to have an inlet end of one of said adjacent conduits at an elevation higher than the inlet end of the other of said adjacent conduits, the outlet ends of adjacent ones of said conduits being spaced from each other and generally horizontally extending as to have the respective axes of flows therefrom in generally the same elevational plane, and each of said conduits having a configuration comprising a single bend therein generally between the inlet and outlet ends thereof.

Various general and specific objects, advantages and aspects of the invention will become apparent when reference is made to the following detailed description considered in conjunction with the accompanying drawings.

BRIEF DESCRIPTION OF THE DRAWINGS

In the drawings wherein for purposes of clarity certain details and/or elements are omitted from one or more views:

FIG. 1 is a somewhat simplified perspective view of a headbox, for a papermaking machine, employing teachings of the invention;

FIG. 2 is a vertical cross-sectional view taken generally along the axis of one of the conduits or tubes of FIG. 1 and also passing through the axis of a portion of the next adjacent conduit or tube as to illustrate such conduits as they effectively pass through the front wall of the manifold-like chamber of FIG. 1;

FIG. 3A is a view somewhat similar to FIG. 2 but illustrating a further embodiment or modification of the invention; and FIG. 3B is a fragmentary side elevational view taken as from the left side (as viewed in FIG. 3A) of the structure shown in FIG. 3A.

DETAILED DESCRIPTION OF THE PREFERRED EMBODIMENT

Referring now in greater detail to the drawings, a manifold-like chamber means 1 is depicted as extending generally horizontally as to be generally transverse of the direction of operation of the associated machine. For ease of understanding, the associated machine may be considered as having its pulp stock carrying means, such as, for example, belt or screen means, running or moving in a direction generally normal (as viewed from above) to the manifold-like chamber means 1 and from left to right as viewed in FIG. 1. The generally considered forward wall 2 of the chamber means 1 may be functionally considered as being a gate or gating means through which passes the fluid pulp stock delivered to the interior of the chamber means 1.

A first plurality of passages or openings are each formed as through gate means or wall 2 as to pass therethrough and be inclined, with respect to the vertical, whereby the inlet end thereof communicating with the interior of chamber means 1 is elevationally lower and the end thereof at the outer surface of wall 2 is elevationally higher. Such first plurality of passages or openings are spaced from each other as along the effective horizontal axis of the chamber means 1.

A first plurality of distribution conduit means 4—4 are respectively partially received in said first plurality of passages as to have the respective inlet ends of the distribution conduit means 4 in communication with the interior of said chamber means 1 and the respective outlet ends of said conduit means 4 situated externally of and outwardly directed from the wall 2 and chamber means 1.

A second plurality of passages or openings are each formed as through gate or wall means 2 as to pass therethrough and be inclined, with respect to the vertical, whereby the inlet end thereof communicating with the interior of chamber means 1 is elevationally higher and the end thereof at the outer surface of wall 2 is elevationally lower. Such second plurality of passages or openings are spaced from each other as along the effective horizontal axis of the chamber means 1. As is best illustrated in FIG. 2, the inlet ends of the said second plurality of passages or openings are at an elevation substantially higher than the elevation of the inlet ends of the said first plurality of passages or openings. In the preferred embodiment, the inlet ends of the first plurality of passages or openings and the inlet ends of the second plurality of passages or openings are in generally staggered relationship whereby vertical planes passing through the respective centers thereof would be generally interleaved.

A second plurality of distribution conduit means 5-5 are respectively partially received in said second plurality of passages as to have the respective inlet ends of the distribution conduit means 5 in communication with the interior of said chamber means 1 and the respective outlet ends of said conduit means 5 situated externally of and outwardly directed from the wall 2 and chamber means 1.

As best seen in both FIGS. 1 and 2, the outlet ends of the said distribution conduits 4 and 5 are so situated as to have the respective axes thereof substantially coplanar with such plane being horizontally disposed.

As should be noted, in the preferred embodiment, each of the distribution conduits 4-4 and 5-5, are comprised of a first generally straight portion situated generally in the respective passages or openings of the wall 2 and a second generally straight portion situated externally of the wall 2 and positioned generally horizontally. Such two straight portions of the respective single bend portions which, among other things serve as a transition between adjoining straight portions. Further, in the preferred embodiment, when viewed as from above, the second or outer generally straight portions of the distribution conduits 4-4 and 5-5 are so positioned as to have vertical planes passing through the axes thereof be substantially parallel to each other.

OPERATION OF INVENTION

As the supply of fluid pulp stock is fed into the chamber means 1 such stock flows as to effectively fill the chamber means 1 and thereafter flows out of the filled chamber means 1 as by flowing into the inlet ends of distribution conduits 4-4 and 5-5. The fluid pulp stock then continues to flow through distribution conduits 4-4 and 5-5 ultimately exiting therefrom at the respective outlet ends thereof and into the area of the channel outlet means 6 (which is depicted in phantom line) such possibly comprising a portion of associated feed nozzle means or the like.

The invention, by providing substantial spacing between any two inlets to the distribution conduits reduces the possibility of long fibers becoming caught, as at opposite ends, in adjoining distribution conduits. Further, in the preferred embodiment, the inner surface of wall means 2 is comprised of upper inclined surface 7 and lower inclined surface 8 which are joined to each other as along a horizontally extending apex or edge 9. As best depicted in FIG. 2, in the preferred embodiment, surface 7 is so formed as to be substantially normal to the axis of the inlet ends of the said second plurality of passages or openings and to the inlet ends of the distribution conduits 5-5 while surface 8 is so formed as to be substantially normal to the axis of the inlet ends of the said first plurality of passages or openings and to the inlet ends of the distribution conduits 4-4. As a consequence of this, the change in direction of flow of the fluid pulp stock from the interior of said chamber means 1 and into the respective distribution conduits is never more than substantially 90° and, therefore, the existence of sharp corners, which may tend to snag expecially the long fibers within the fluid pulp, is eliminated along with the problems attendent thereto.

As already indicated, the apex or edge means 9 is provided in the preferred embodiment of the invention. The provision of such means 9 serves to generate, within the flowing chamber means 1, varying flow currents which, in turn, serve to lessen (if not totally eliminate) the chance of any adhesion occurring as between the fibers within the pulp stock and the inner surface of chamber means 1, expecially surfaces 7 and 8. In this respect, the modification of FIGS. 3A and 3B illustrate the provision of edge or ledge means 10 which may be comprised as of a generally horizontally extending bar suitably secured to the interior surface of the wall 2. It is also contemplated that such a bead 10 may be integrally formed with wall 2. It has been discovered that such a bead means 10 is highly capable of creating and influencing the flow characteristics of the fluid pulp stock as to eliminate the adhesion and/or accumulation of fibers in the area of the said inlet orifices. The ridge means 10 effectively produces such results independently of the other inventive concepts and features disclosed herein.

Further, by providing the said single bend in the respective distribution conduits 4-4 and 5-5, at least a micro-turbulence is created, in the flow therethrough, which further improves the distribution of, for example, long fibers.

As is apparent, the invention not only provides against the undesired accumulation of fibers in the various paths of flow but also provides distribution means assuring maximum uniformity in the ultimate distribution of pulp filbers for the following papermaking operations.

Although only a preferred embodiment and select modifications of the invention have been disclosed and described, it is apparent that other embodiments and modifications of the invention are possible within the scope of the appended claims.

What is claimed is:

1. A headbox for a papermaking machine, comprising manifold-like chamber means for flowingly receiving therethrough a fluid supply of pulp stock, said manifold-like chamber means extending substantially horizontally and transversely of said papermaking machine, channel outlet means for discharging said fluid pulp stock therefrom for further processing into paper, said channel outlet means extending transversely the full width of said papermaking machine as to thereby define the full width of said discharged pulp stock, a plurality of distribution conduits communicating directly with and between said manifold-like chamber means and said channel outlet means, said plurality of distribution conduits being effective to flow said pulp stock directly from said manifold-like chamber means to said channel outlet means, each of said plurality of distribution conduits having an inlet end communicating directly with said manifold-like chamber means and an outlet end communicating directly with said channel outlet means, said inlet ends of adjacent ones of said distribution conduits respectively lying in separate planes spaced from each other, said outlet ends of said plurality of distribution conduits being disposed in a single plane and parallel to each other; each of said plurality of distribution conduits having a configuration comprising only a single bend of a single direction generally between the inlet and outlet ends thereof, said manifold-like chamber means comprising an inner wall surface at least partly defining the interior of said chamber means, wherein each of said inlet ends of said plurality of distribution conduits communicates with said chamber means through said inner wall surface, and edge-defining flow separator means along said inner wall surface as to effectively define a portion of said chamber means, said edge-defining flow separator means extending longitudinally in said manifold-like chamber means, wherein said inlet ends lying in one of said separate planes communicate with said chamber means through said inner wall surface at a first longitudinal side of said edge-defining flow separator means, and wherein said inlet ends lying in an other of said separate planes communicate with said chamber means through said inner wall surface at a second longitudinal side of said edge-defining flow separator means opposite to said first longitudinal side.

2. A headbox for a papermaking machine according to claim 1 wherein said inlet ends lying in said one of said separate planes are both horizontally and vertically spaced from said inlet ends lying in said other of said separate planes.

3. A headbox for a papermaking machine according to claim 1 wherein each of said distribution conduits comprises a generally inner straight conduit portion and a generally outer straight conduit portion, wherein said single bend operatively interconnects said inner and outer straight conduit portions, and wherein said outlet ends are respectively formed in said outer straight conduit portions.

4. A headbox for a papermaking machine according to claim 1 wherein said edge-defining flow separator means comprises a longitudinally extending ledge like portion.

5. A headbox for a papermaking machine according to claim 1 wherein said edge-defining flow separator means comprises a longitudinally extending ledge-like portion integrally formed with said inner wall surface.

6. A headbox for a papermaking machine according to claim 1 wherein said edge-defining flow separator means comprises a longitudinally extending member operatively secured to said inner wall surface.

7. A headbox for a papermaking machine according to claim 1 wherein said inner wall surface comprises a generally upper disposed inclined surface portion and a generally lower disposed inclined surface portion, wherein said inlet ends lying in said one of said separate planes are formed in said upper disposed inclined surface portion, wherein said inlet ends lying in said other of said separate planes are formed in said lower disposed inclined surface portion, wherein the axes of flow of said inlet ends formed in said upper disposed inclined surface portion are substantially normal to that part of said upper disposed inclined surface portion generally surrounding said inlet ends formed in said upper disposed inclined surface portion, wherein the axes of flow of said inlet ends formed in said lower disposed inclined surface portion are substantially normal to that part of said lower disposed inclined surface portion generally surrounding said inlet ends formed in said lower disposed inclined surface portion, and wherein said axes of said inlet ends formed in said upper disposed inclined surface portion diverge from said axes of said inlet ends formed in said lower disposed inclined surface portion, such divergence of said axes increasing as said axes extend from said inclined surface portions toward said chamber means.

8. A headbox for a papermaking machine according to claim 7 wherein said upper disposed inclined and lower disposed inclined surface portions meet each other as to conjointly define an apex-like edge means, wherein said flow separator means comprises said apex-like edge means, and wherein said apex-like edge means extends generally longitudinally within said chamber means as to cause desired flow patterns within the fluid pulp stock in said chamber means.

* * * * *